United States Patent
Kim et al.

(10) Patent No.: US 8,217,837 B2
(45) Date of Patent: Jul. 10, 2012

(54) SYSTEM AND METHOD FOR PROVIDING TRIGGERED LOCATION INFORMATION

(75) Inventors: Joo-Young Kim, Suwon-si (KR); Wuk Kim, Gwacheon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 372 days.

(21) Appl. No.: 12/267,879

(22) Filed: Nov. 10, 2008

(65) Prior Publication Data

US 2009/0121939 A1 May 14, 2009

(30) Foreign Application Priority Data

Nov. 8, 2007 (KR) .......................... 10-2007-0113948

(51) Int. Cl.
*G01S 3/02* (2006.01)
*G01S 19/31* (2010.01)
*G08B 1/08* (2006.01)

(52) U.S. Cl. .................. 342/450; 342/357.71; 342/463; 340/539.13

(58) Field of Classification Search .................. 342/450, 342/453, 463–465, 357.71; 455/456.1, 456.2; 340/539.13
See application file for complete search history.

(56) References Cited

U.S. PATENT DOCUMENTS

2007/0182547 A1* 8/2007 Wachter et al. .......... 340/539.13
* cited by examiner

*Primary Examiner* — Dao Phan
(74) *Attorney, Agent, or Firm* — Jefferson IP Law, LLP (57) ABSTRACT

A system and a method for enabling a Home-SUPL Location Platform (H-SLP) to rapidly identify a currently available positioning method of a target SUPL-Enabled terminal (target SET) are provided. To this end, a message, including positioning capabilities (SET capabilities) which represent whether one or more positioning methods exist, to be transmitted from the target SET to the H-SLP is configured to additionally include information representing whether each positioning method is currently available. Accordingly, even if an electric wave environment of the target SET is changed or a positioning method is changed, the H-SLP can rapidly and efficiently perform a positioning because it always recognizes a currently available positioning method.

24 Claims, 4 Drawing Sheets

| Parameter | Presence | Value/Description |
|---|---|---|
| SET capabilities | - | SET capabilities (not mutually exclusive) in terms of supported positioning technologies and positioning protocols. During a particular SUPL session, a SET may send its capabilities more than once – specifically, in SET initiated cases the SET capabilities are sent in SUPL START and in SUPL POS INIT. In immediate requests, the SET capabilities MUST NOT change during this particular session.<br><br>For a triggered request, the SET capabilities MAY change during a session. |
| >Pos Technology | M | Defines the positioning technology. Zero or more of the following positioning technologies (bitmap):<br><br>● SET-assisted A-GPS<br>● SET-based A-GPS<br>● Autonomous GPS<br>● AFLT<br>● E-CID<br>● E-OTD<br>● OTDOA<br><br>Note. The E-CID bit SHALL be set only when TA and/or NMR information or Pathloss information is provided within the Location ID IE. |
| >Pref Method | M | One of the following preferred modes:<br><br>● A-GPS SET-assisted preferred<br>● A-GPS SET-based preferred<br>● No preferred mode |
| >Pos Protocol | M | Zero or more of the following positioning protocols (bitmap):<br><br>● RRLP<br>● RRC<br>● TIA-801 |
| > MAX Geo Target Area | M | Maximum number of Geographic Target Area lists supported (8.26.2.2) |
| > MAX Area Id List | M | Maximum number of Area Id Lists supported (8.26.2.2) |
| ... | ... | ... |
| ... | ... | ... |
| ... | ... | ... |

FIG.4

SYSTEM AND METHOD FOR PROVIDING TRIGGERED LOCATION INFORMATION

PRIORITY

This application claims the benefit under 35 U.S.C. §119(a) of a Korean patent application filed in the Korean Industrial Property Office on Nov. 8, 2007 and assigned Serial No. 2007-113948, the entire disclosure of which is hereby incorporated by reference.

BACKGROUND OF THE INVENTION

1. Field of the Invention

The present invention relates to a system and method for providing triggered location information. More particularly, the present invention relates to a Secure User Plane Location (SUPL), which is under discussion in a Location (LOC) group, one of the working groups belonging to the Open Mobile Alliance (OMA) standard organization.

2. Description of the Related Art

Figure 1:
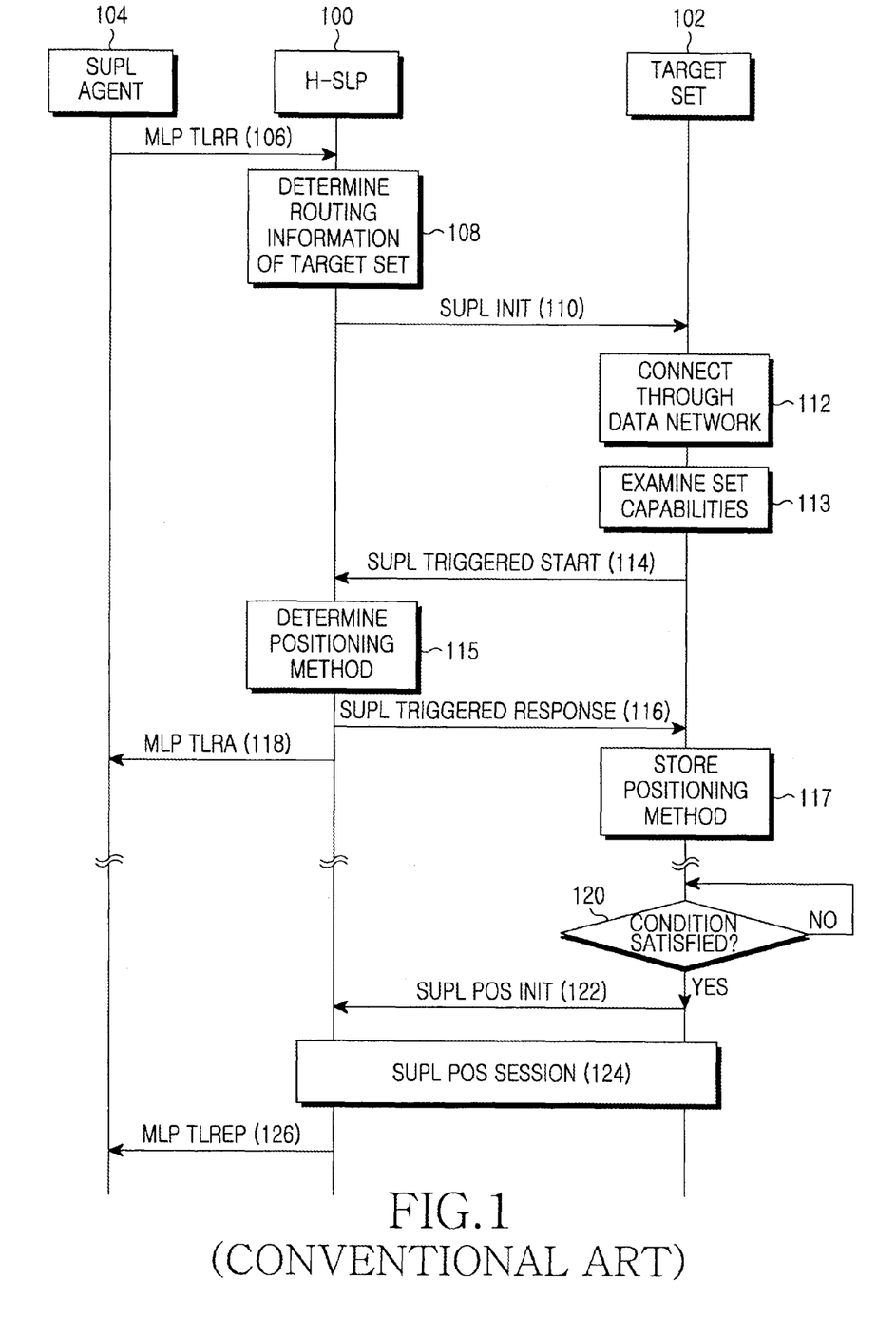
FIG. 1 is a flow diagram illustrating a flow of signals for a conventional triggered location request service defined in a SUPL 2.0 standard.

FIG. 1 is a diagram illustrating a signal flow for a conventional triggered location request service defined in the SUPL 2.0 standard, the entire disclosure of which is hereby incorporated by reference.

A location information providing system using the SUPL 2.0 standard includes a SUPL Agent 104 for requesting a location of a target SUPL-Enabled Terminal (target SET) 102, a Home-SUPL Location Platform (H-SLP) 100 which is requested by the SUPL Agent 104 to provide the location information of the target SET 102 and performs a positioning process together with the target SET 102, and the target SET 102 which is a target of the request for the location information.

When the SUPL Agent 104 desires to know a location of the target SET 102, whenever a preset condition is satisfied, the SUPL Agent 104 transmits a Mobile Location Protocol Triggered Location Reporting Request (MLP TLRR) message to the H-SLP 100 in step 106. The MLP TLRR message includes an ID (client-id) of the SUPL Agent 104, an ID (msid) of the target SET 102, a service initiation time, a service end time, location information transmission conditions, etc. Herein, if a location of the target SET 102 is provided at every preset period of time (periodic trigger), the location information transmission condition corresponds to a time. If a location of the target SET 102 is provided whenever a specific event occurs (event trigger), the location information transmission condition corresponds to a specific event occurrence condition.

When receiving the MLP TLRR message, the H-SLP 100 performs an authentication process of the SUPL Agent 104. When the H-SLP 100 determines that the SUPL Agent 104 has been authorized to get a location value of the target SET 102, the H-SLP 100 determines routing information of the target SET 102 in step 108. That is, the H-SLP 100 determines if the target SET 102 is in a roaming state and if the target SET 102 can support a SUPL protocol. Herein, it is assumed that the target SET 102 is in a non-roaming state. When it is determined that the target SET 102 is in the non-roaming state and supports the SUPL protocol, the H-SLP 100 transmits a SUPL INIT message to the target SET 102 in step 110. When receiving the SUPL INIT message, the target SET 102 enables a data connection with the H-SLP 100 in step 112.

After the data connection is established, the target SET 102 examines currently supportable positioning capabilities (SET capabilities) in step 113 and transmits a SUPL TRIGGERED START message, including the SET capabilities, to the H-SLP 100 in step 114. That is, the SUPL TRIGGERED START message contains SET capabilities' parameters which include information about a protocol and a positioning method supportable by the target SET 102. When receiving the SUPL TRIGGERED START message, the H-SLP 100 determines a positioning method by using the SET capabilities in step 115, and then transmits a SUPL TRIGGERED RESPONSE message, including the determined positioning method, to the target SET 102 in step 116.

When receiving the SUPL TRIGGERED RESPONSE message, the target SET 102 stores the determined positioning method in a memory in step 117. Then, the H-SLP 100 transmits a Mobile Location Protocol Triggered Location Reporting Acquisition (MLP TLRA) message to the SUPL Agent 104 to notify that the triggered location request service has been accepted in step 118.

After the H-SLP 100 reports that the triggered location request service has been accepted, the data network access between the H-SLP 100 and the target SET 102 is terminated. Thereafter, the target SET 102 determines if a location information transmission condition is satisfied in step 120. When the location information transmission condition is not satisfied, the target SET 102 is maintained in the current state. In contrast, when the location information transmission condition is satisfied, the target SET 102 transmits a SUPL POS INIT message to the H-SLP 100 to report an initiation of the positioning in step 122. When the SUPL POS INIT message has been received, the data network access is established between the H-SLP 100 and the target SET 102, and a SUPL POS session process is performed between the H-SLP 100 and the target SET 102 according to the determined positioning method in step 124.

When the calculation of a location value has been finished in the SUPL POS session process of step 124, the H-SLP 100 transmits the location value of the target SET 102 to the SUPL Agent 104 through a Mobile Location Protocol Triggered Location Report (MLP TLREP) message in step 126. After the location value of the target SET 102 is transmitted to the SUPL Agent 104, the data network access between the H-SLP 100 and the target SET 102 is terminated, and the target SET 102 again determines if the location information transmission condition is satisfied in step 120. Steps 120 to 126 are repeatedly performed until a service end time.

As described above, according to the triggered location request service, whenever the location information transmission condition is satisfied, the positioning process is performed between the H-SLP 100 and the target SET 102, and a location value obtained through the calculation process is transmitted to the SUPL Agent 104. When the location information transmission condition is satisfied, the target SET 102 transmits a SUPL POS INIT message to the H-SLP 100, wherein the SUPL POS INIT message includes the positioning capabilities (SET capabilities) of the target SET 102. However, the SET capabilities according to the conventional triggered location request service contain only information about types of positioning modules (e.g. A-GPS, TDOA, etc.) included in the target SET 102, and does not contain any information about whether or not each positioning module is actually operating. This is because only an immediate location request service where a location value is calculated is only considered once in the SUPL 1.0 standard. That is, the immediate location request service has been designed with the idea that merely reporting information about what types of positioning modules are in the target SET 102 would be sufficient. However, this is based on the assumption that most of positioning modules in the target SET 102 are operating.

Such an idea is reflected, even in a SUPL 2.0 standard, that proposes the triggered location request service, without any change.

In contrast to the immediate location request service of the SUPL 1.0 standard in which a location value is calculated only once, the triggered location request service is a service for calculating a location value of the target SET 102 over a long period of time, so that a situation of the target SET 102 may be changed during a service period. That is, for example, the target SET 102 may move to an area where a GPS signal cannot be received while the location of the target SET 102 is being calculated by using GPS, and the target SET 102 may receive signals from three or less adjacent cells while the location of the target SET 102 is being calculated by using Time Difference Of Arrival (TDOA).

In this case, the H-SLP 100 performs a SUPL POS session process without recognizing the current situation of the target SET 102, and therefore, cannot recognize that it is not possible to calculate the location of the target SET 102 until the SUPL POS process is performed. However, since the H-SLP 100 cannot still recognize the current situation of the target SET 102, the H-SLP 100 re-performs a SUPL POS session process, and transmits an error message to the SUPL Agent 104 after it has been continuously subjected to a failure in the positioning for a preset period of time. Therefore, when the positioning is not possible, the SUPL Agent 104 may wait for a location service for a long time despite the SUPL Agent 104 not being able to receive any location information in the end.

Further, when the target SET 102 has two or more positioning modules, the H-SLP 100 first uses a first positioning method having the highest priority, and then uses a second positioning method when it is not possible to use the first positioning method. Therefore, when it is not possible to use the positioning method having the highest priority, it may take too much time until the user of the SUPL Agent 104 receives a location service.

SUMMARY OF THE INVENTION

An aspect of the present invention is to address the above-mentioned problems and/or disadvantages and to provide at least the advantages described below. Accordingly, an aspect of the present invention is to provide a location information providing system and method for continuously providing a triggered location request service by taking a situation of a target terminal SET into consideration.

Another aspect of the present invention is to provide a location information providing system and method for more rapidly providing a triggered location request service.

Further, another aspect of the present invention is to provide a system and method for providing triggered location information so that the number of unnecessary processes can be reduced when positioning is not possible in a target SET.

In accordance with an aspect of the present invention, a system for providing triggered location information is provided. The system includes a Home-SUPL Location Platform (H-SLP) and a target SUPL-Enabled terminal (target SET). The system also includes the target SET for transmitting a message, which includes a first positioning capability containing information about availability of at least one positioning method, in response to a request for location information, and transmitting a positioning start message, which includes a second positioning capability containing information about availability of at least one positioning method when a preset location information transmission condition is satisfied; and the H-SLP for determining a positioning method which can be provided when receiving the message including the first positioning capability, transmitting a message including the determined positioning method to the target SET, and determining if the second positioning capability is substantially identical to the first positioning capability when receiving the positioning start message.

In accordance with another aspect of the present invention, a system for providing triggered location information, the system including a Home-SUPL Location Platform (H-SLP) and a target SUPL-Enabled terminal (target SET), is provided. The system includes the H-SLP for performing a positioning with the target SET at a request for a location service, and the target SET for examining a positioning capability, that represents at least one supportable positioning method and information about whether the positioning method is available, while a location service is maintained with the H-SLP, and transmitting a message which includes a changed positioning capability to the H-SLP whenever it is determined that the positioning capability has been changed as a result of the examining.

In accordance with still another aspect of the present invention, a method for providing triggered location information in a location information providing system which includes a Home-SUPL Location Platform (H-SLP) and a target SUPL-Enabled terminal (target SET) is provided. The method includes receiving, by the H-SLP, a message which includes a first positioning capability containing information about availability of at least one positioning method from the target SET, determining, by the H-SLP, a currently available positioning method, and transmitting a message including the determined positioning method to the target SET, transmitting, by the target SET, a message which includes a second positioning capability containing information about availability of at least one positioning method to H-SLP when a preset location information transmission condition is satisfied, and determining, by the H-SLP, if the second positioning capability is substantially identical to the first positioning capability.

In accordance with still another aspect of the present invention, a method for providing triggered location information in a location information providing system which includes a Home-SUPL Location Platform (H-SLP) and a target SUPL-Enabled terminal (target SET) is provided. The method includes performing, by the H-SLP, a location service with the target SET at a request for a location service; examining, by the target SET, a positioning capability representing availability of at least one supportable positioning method while the location service is maintained, determining, by the target SET, if the positioning capability is changed based on a result of the examining, and transmitting, by the target SET, a message including the changed positioning capability to the H-SLP whenever the positioning capability is changed.

In accordance with still another aspect of the present invention, a system for providing triggered location information, the system including a Home-SUPL Location Platform (H-SLP) and a target SUPL-Enabled terminal (target SET), is provided. The system includes the target SET for transmitting a message, which includes a first positioning capability containing information about availability of at least one positioning method, in response to a request for location information from the H-SLP, determines if a positioning method determined by the H-SLP is available when a preset location information transmission condition is satisfied, and transmitting a positioning start message, which includes a second positioning capability according to a result of the determination; and the H-SLP for determining a positioning method which can be provided by the H-SLP when receiving the message including the first positioning capability, transmitting a message including the determined positioning method to the target SET, and performing a positioning with the target SET by using the determined positioning method when the second positioning capability included in the positioning start message is substantially identical to the first positioning capability.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiment of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of known-known functions and configurations will be omitted for clarity and conciseness.

Exemplary embodiments of the present invention provide a function of enabling the Home-SUPL Location Platform (H-SLP) to rapidly identify a currently available positioning method of a target Secure-User-Plane-Location (SUPL) Enabled terminal (target SET). To this end, an exemplary embodiment of the present invention is implemented in such a manner that, when the H-SLP receives a message, including positioning capabilities (SET capabilities) that represent an existence or absence of positioning methods, from the target SET, the H-SLP can acquire the SET capabilities in addition to information representing whether the positioning methods are currently available. Through this, even if either an electric wave environment of an area where the target SET exists or a positioning method is changed, the H-SLP can rapidly and efficiently perform a positioning process because the H-SLP always recognizes a positioning method currently available in the target SET.

Figure 2:
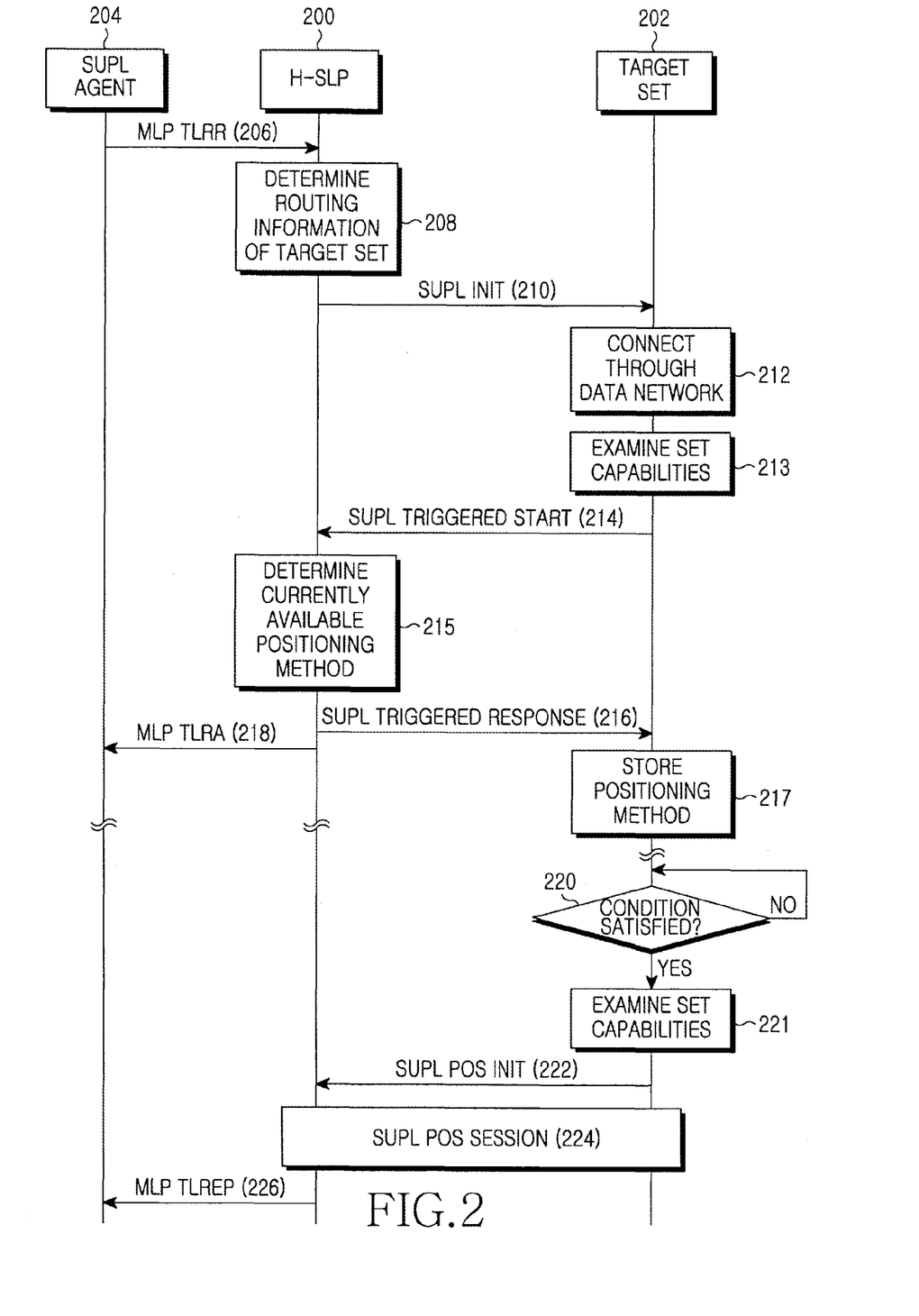
FIG. 2 is a flow diagram illustrating a method for providing triggered location information according to an exemplary embodiment of the present invention.

An operation of the location information providing system having the aforementioned function will now be described with reference to FIG. 2. FIG. 2 is a flow diagram illustrating a method for providing Triggered Location information according to an exemplary embodiment of the present invention. Although the following description with reference to FIG. 2 will be given about an example where a SUPL agent requesting location information of a target SET corresponds to a terminal requesting location information, types of the SUPL agent are not to be limited to the terminal, and various types of agents, including a server, can be used if they can include an application for a location request.

In the location information providing system according to an exemplary embodiment of the present invention, a SUPL Agent 204 requests an H-SLP 200 to provide the triggered location request service by transmitting a Mobile Location Protocol Triggered Location Reporting Request (MLP TLRR) message to the H-SLP 200 in step 206. The MLP TLRR message includes an ID (client-id) of the SUPL Agent 204, an ID (msid) of a target SET 202, a service initiation time, a service end time, location information transmission conditions, etc. Herein, if a location of the target SET 202 is provided at every preset period of time (periodic trigger), the location information transmission condition corresponds to a time. If a location of the target SET 202 is provided whenever a specific event occurs (event trigger), the location information transmission condition corresponds to a specific event occurrence condition.

When receiving the MLP TLRR message, the H-SLP 200 performs an authentication process of the SUPL Agent 204. When it is determined that the SUPL Agent 204 has been authorized to receive a location value of the target SET 202, the H-SLP 200 determines routing information of the target SET 202 in step 208. That is, the H-SLP 200 determines if the target SET 202 is in a roaming state and if the target SET 202 can support a SUPL protocol. Herein, it is assumed that the target SET 202 is in a non-roaming state. When it is determined that the target SET 202 is in the non-roaming state and supports the SUPL protocol, the H-SLP 200 transmits a SUPL INIT message to the target SET 202 in step 210.

When receiving the SUPL INIT message, the target SET 202 establishes a data connection with the H-SLP 200 in step 212. In detail, the target SET 202 determines if the H-SLP 200 is in a proxy mode. Then, the target SET 202 is connected to a data network, such as a packet data network or a circuit switched data network, based on a result of the determining of the proxy mode.

When completing the connection to a data network, the target SET 202 examines the positioning capabilities (SET capabilities) in step 213. With the examining of the SET capabilities, the target SET 202 examines its own types of positioning modules (e.g. A-GPS, TDOA, etc.), and examines which positioning protocol is to be used. Especially, according to an exemplary embodiment of the present invention, the target SET 202 determines if its own positioning modules are available in the current electric wave environment of the target SET 202. As a result, the target SET 202 sets each parameter of positioning methods, which has been determined if they can be currently used, information about positioning protocols, etc., thereby setting the SET capabilities. When the SET capabilities have been set as described above, the target SET 202 generates a SUPL TRIGGERED START message including the SET capabilities in step 213. Then, the target SET 202 transmits the generated SUPL TRIGGERED START message to the H-SLP 200 in step 214. The SUPL TRIGGERED START message is used to start the triggered location request service.

In this case, the SUPL TRIGGERED START message includes a SESSION_ID for differentiating messages exchanged between the H-SLP 200 and the target SET 202, SET capabilities, a hash of the received SUPL INIT message (ver), a location identifier (lid), and so on, like in the conventional triggered location request service.

Figure 4:
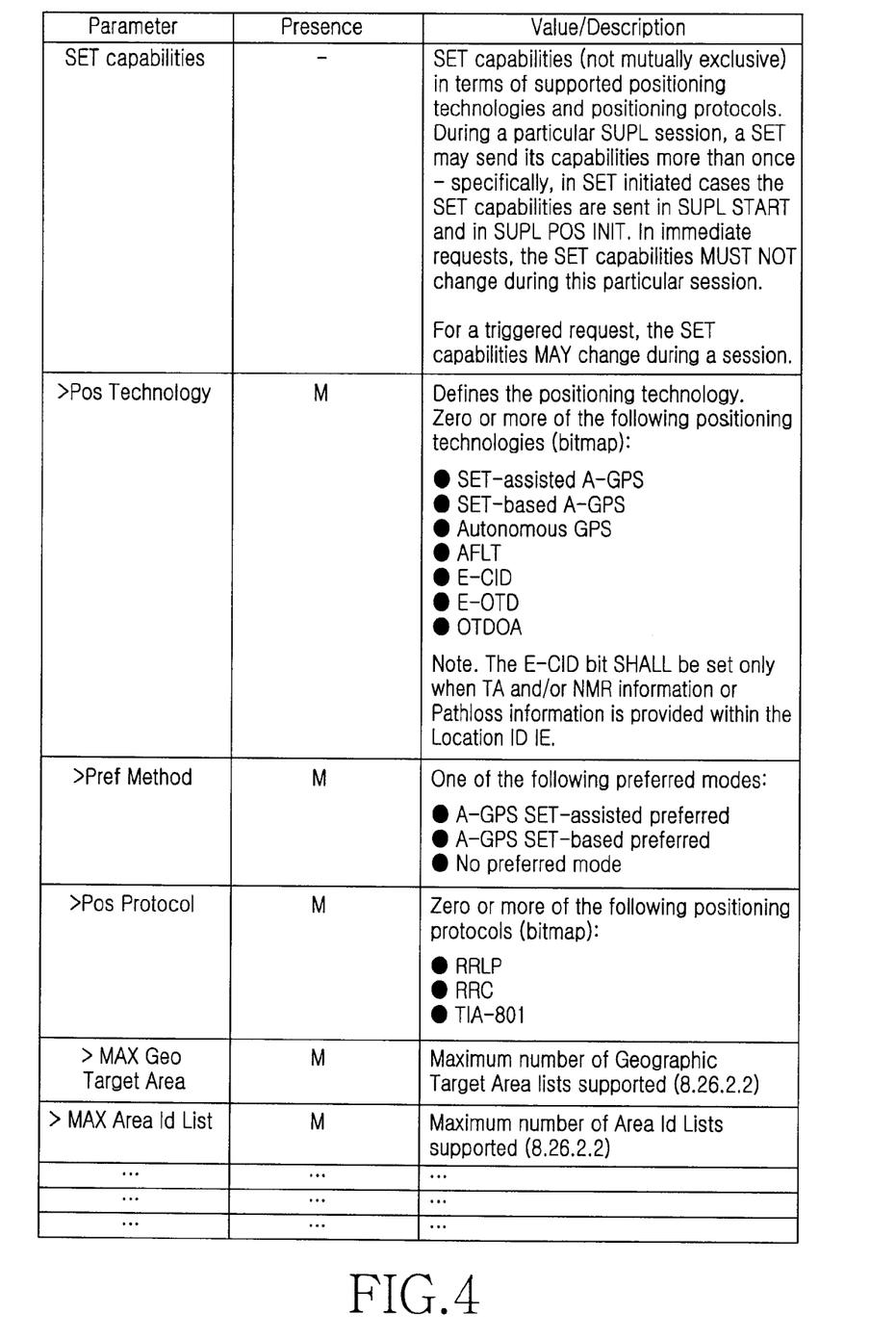
FIG. 4 is a view illustrating a structure of parameters constituting positioning capabilities (SET capabilities) according to an exemplary embodiment of the present invention.

Herein, the SET capabilities include parameters of positioning methods (Pos Technology) existing in the target SET 202, a currently available positioning method (PrefMethod), and positioning protocols. The structure of the parameters constituting the above-described SET capabilities is illustrated in FIG. 4.

When the H-SLP 200 has received the SUPL TRIGGERED START message, the H-SLP 200 determines a currently available positioning method based on the SET capabilities included in the SUPL TRIGGERED START message in step 215. In detail, the H-SLP 200 selects a positioning method currently available in the target SET 202, from among the positioning methods included in the SET capabilities. That is, the target SET 202 reports not only which types of positioning modules exist therein, but also whether or not the respective positioning modules can currently operate.

If there is a plurality of currently available positioning methods, the H-SLP 200 may select positioning methods that the H-SLP 200 can provide, from among the currently available positioning methods. Otherwise, the H-SLP 200 may set priorities of the currently available positioning methods. In this case, the priorities may be set in various manners depending on the user's selection or the provider's policy. For example, the H-SLP 200 may determine priorities of the positioning methods based on accuracy (i.e. QoP), or may determine priorities according to various conditions, such as cost or time, which are required to perform the positioning of the target SET 202.

When the target SET 202 has two or more positioning modules, as described above, the existing H-SLP can recognize only the types of the positioning modules that the target SET 202 has. Accordingly, in this case, the target SET 202 has no choice but to sequentially examine the availabilities of positioning methods according to the priorities defined by the H-SLP 200 in order to determine a positioning method to be used among the positioning methods of the positioning modules. In other words, the target SET 202 has no choice but to first use a positioning method having the highest priority, and when it is not possible to perform a positioning through the positioning method, to use the next positioning method. However, according to an exemplary embodiment of the present invention, the target SET 202 directly and previously reports whether the respective positioning methods are available. Accordingly, the H-SLP 200 can identify all currently available positioning methods among the positioning methods that exist in the target SET 202. As a result, according to an exemplary embodiment of the present invention, it is unnecessary to perform a process of determining which positioning method is to be used based on priorities. Further, according to an exemplary embodiment of the present invention, since information about available positioning methods is reported, when a positioning through the available positioning methods is not possible, the H-SLP 200 can immediately notify the SUPL agent 204 of the occurrence of an error upon receiving the SUPL POS INIT message, without performing the SUPL POS session process.

After determining a positioning method, the H-SLP 200 generates a SUPL TRIGGERED RESPONSE message including information about the determined positioning method. If there are two or more available positioning methods, the number of determined positioning methods may be two or more. Therefore, when there may be a plurality of determined positioning methods, information about priorities and information about positioning methods corresponding to the respective priorities are included in the SUPL TRIGGERED RESPONSE message. Next, the H-SLP 200 proceeds to step 216, where the H-SLP 200 transmits the generated SUPL TRIGGERED RESPONSE message to the target SET 202. Then, the target SET 202 acquires information about the determined positioning methods from the SUPL TRIGGERED RESPONSE message and then stores the acquired information in step 217.

After transmitting the SUPL TRIGGERED RESPONSE message to the target SET 202, the H-SLP 200 transmits an MLP TLRA message to the SUPL agent 204 in step 218. Such an MLP TLRA message notifies the SUPL agent 204 that the request for the triggered location request service has been accepted. Through this, the target SET 202 and the H-SLP 200 can terminate the data connection currently established therebetween.

Although the data connection has been terminated as described above, the target SET 202 determines if the location information transmission condition is satisfied in step 220 in order to provide the triggered location request information. Such a determination process is repeatedly or periodically performed until the location information transmission condition is satisfied. Herein, the location information transmission condition may include a condition that a period set to provide a location service has expired, or a condition that the target SET 202 has arrived at a specified position. When the location information transmission condition is satisfied, the target SET 202 examines the SET capabilities in step 221. The process of examining the SET capabilities in step 221 is performed to identify currently available positioning methods, like in step 213. In step 222, the target SET 202 transmits a SUPL POS INIT message, including new SET capabilities, which contain information about whether the respective currently supportable positioning methods are available, to the H-SLP 200, thereby reporting the initiation of a positioning. Otherwise, the target SET 202 may determine if a stored positioning method determined by the H-SLP 200 is currently available, and then transmit a message, including SET capabilities which contain information about whether the determined positioning method is available. In this case, the target SET 202 may perform the process of determining whether a positioning method is available with respect to not only the determined positioning method, but also other positioning methods supportable by the target SET 202, and then transmit a message including SET capabilities, which contain information about results of the determinations. As described above, the target SET 202 transmits a SUPL POS INIT message, including the SET capabilities which contain information about whether the positioning methods are available so that the H-SLP 200 can recognize whether the positioning methods supportable by the target SET 202 are available.

For example, it may be assumed that first SET capabilities include positioning methods using a GPS and a TDOA as positioning methods supportable by the target SET 202, and information about whether the respective positioning methods are available. Then, the target SET 202 identifies its own positioning methods, and then determines positioning methods that can be used in the current electric wave environment. Such a determination process, that is, a process of examining SET capabilities representing whether supportable positioning methods are available, is repeatedly performed whenever the location information transmission condition is satisfied.

Otherwise, the target SET 202 may first determine if a positioning method determined by the H-SLP 200 is available in the current electric wave environment when the location information transmission condition is satisfied. When it is determined that the positioning method determined by the H-SLP 200 is available, the target SET 202 transmits a SUPL POS INIT message, including the same SET capabilities as the first SET capabilities, to the H-SLP 200 in step 222.

As described above, whenever the location information transmission condition is satisfied, the target SET 202 identifies supportable positioning methods, and then transmits the SUPL POS INIT message, including new SET capabilities which contain the identified positioning methods and information about whether the recognized positioning methods are available, to the H-SLP 200.

When the H-SLP 200 receives the SUPL POS INIT message, a data network connection is established between the H-SLP 200 and the target SET 202. Then, when the SET capabilities included in the received SUPL POS INIT is identical to the first SET capabilities, the SUPL POS session process between the H-SLP 200 and the target SET 202 is performed according to the stored positioning method in step 224. However, when there is a change in the SET capabilities, the H-SLP 200 determines a new positioning method that can be provided, and then transmits information about the determined positioning method to the target SET 202. Then, the target SET 202 stores the new positioning method, and the H-SLP 200 and the target SET 202 perform a positioning by using the new positioning method that is available. Since the H-SLP 200 has recognized a currently available positioning method, as described above, the H-SLP 200 can more rapidly perform a positioning by using the positioning method.

When the calculation of a location value has been completed through the SUPL POS session process, the H-SLP 200 transmits the location value of the target SET 202 to the SUPL agent 204 through a Mobile Location Protocol Triggered Location Report (MLP TLREP) message in step 226. After the location value of the target SET 202 has been transmitted to the SUPL agent 204, the data network connection established between the H-SLP 200 and the target SET 202 is terminated, and the target SET 202 returns to step 220, where the target SET 202 determines if the location information transmission condition is satisfied. Steps 220 through 226 are repeatedly performed until a service end time.

According to the aforementioned exemplary embodiments of the present invention, SET capabilities are examined to identify currently available positioning methods whenever the location information transmission condition is satisfied. However, according to another exemplary embodiment of the present invention, the target SET 202 may continuously examine SET capabilities while a location service is being provided, regardless of whether the location information transmission condition is satisfied. That is, according to said another exemplary embodiment of the present invention, after the first positioning method is stored and the data connection is released, the target SET 202 continuously examines SET capabilities while the location service is being provided.

Figure 3:
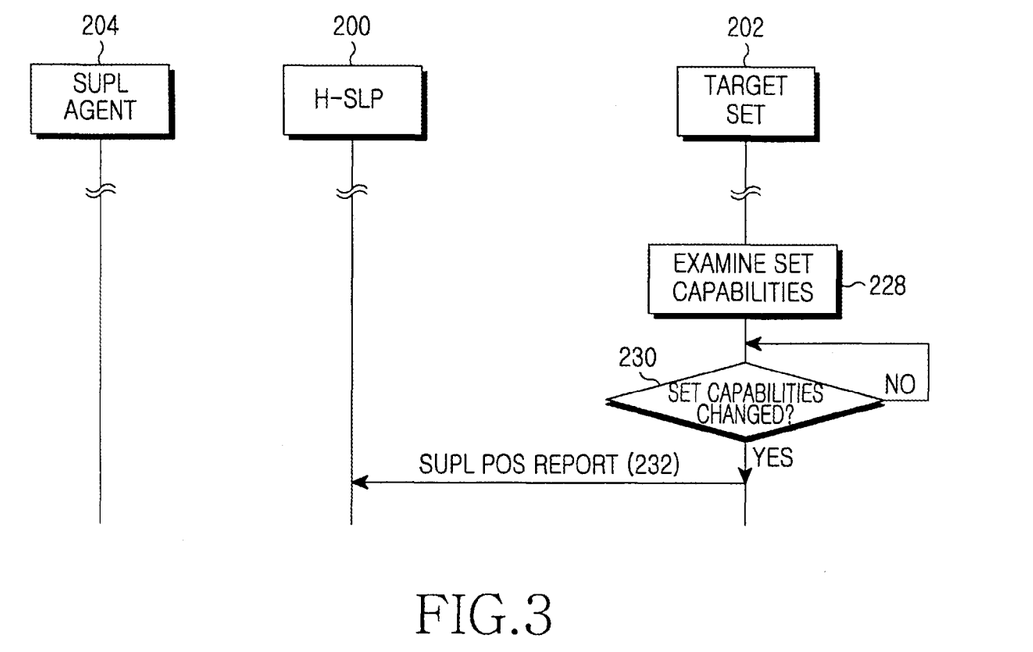
FIG. 3 is a flow diagram illustrating a method for providing triggered location information according to another exemplary embodiment of the present invention.

Referring to FIG. 3, the target SET 202 continuously examines SET capabilities while a location service is being performed, as shown in step 228. This is intended to immediately reflect the availability/unavailability of positioning methods in the target SET 202, which depends on a change in the current electric wave environment. Therefore, the target SET 202 determines if the electric wave environment corresponds to an environment where the currently existing positioning method is unavailable, and determines if the availability of the positioning method has changed based on a result of the determination. That is, the target SET 202 examines the SET capabilities, thereby determining if the SET capabilities have changed in step 230. It is necessary for the H-SLP 200 to immediately recognize a station where the target SET 202 in service moves to another electric wave environment and thus stored positioning methods are unavailable, and to determine an available positioning method in advance.

When the SET capabilities have changed, the target SET 202 transmits a SUPL POS REPORT message, including the changed SET capabilities, to the H-SLP 200 in step 232. As described above, whenever the SET capabilities have changed, the target SET 202 can transmit the SUPL POS REPORT message, reporting the changed SET capabilities, to the H-SLP 200. Therefore, the H-SLP 200 determines a new available positioning method as soon as the SET capabilities have changed, and then the target SET 202 receives the determined positioning method for storage of the determined positioning method. By using the SUPL POS REPORT message, as described above, the SUPL POS session process is not required when a positioning is not possible in the target SET 202, thereby reducing the number of unnecessary processes. Further, since the H-SLP 200 can always recognize a positioning method that is currently available in the target SET 202, the H-SLP 200 can previously determine a positioning method to be used in advance before receiving a SUPL POS INIT message. When receiving a SUPL POS INIT message in a state where a positioning method has been determined in advance, as described above, it is possible to immediately use the determined positioning method, thereby making it possible to rapidly perform the positioning.

According to the conventional technology, information about only types of existing positioning modules is reported through SET capabilities. However, according to an exemplary embodiment of the present invention, even information about whether each positioning module can operate is reported through SET capabilities. Therefore, according to an exemplary embodiment of the present invention, when a positioning is not possible, it is possible to immediately report an occurrence of an error to the SUPL Agent upon reception of a SUPL POS INIT message, without performing the SUPL POS session process.

Also, according to the conventional technology, when the target SET 102 has two or more positioning modules, a first positioning method having the highest priority is first used, and then the next positioning method is used when the first positioning method is unavailable. However, according to an exemplary embodiment of the present invention, since the H-SLP has recognized a currently available positioning method, it is possible to rapidly perform a positioning by using the currently available positioning method, even if the target SET has two or more positioning modules.

Furthermore, according to exemplary embodiments of the present invention, since SET capabilities are reported through a SUPL POS REPORT message either periodically or whenever a change occurs in the operation possibility of each positioning module, it is possible to determine a positioning method in advance, before a SUPL POS INIT message is received. Accordingly, when receiving a SUPL POS INIT message from the target SET, the H-SLP can rapidly perform a positioning by using the previously determined positioning method.

While the present invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A Home-SUPL Location Platform (H-SLP) in a system for providing triggered location information, the system comprising the H-SLP and a target SUPL-Enabled terminal (target SET), the H-SLP comprising:
the H-SLP for receiving a request message for triggered location reporting service about the target SET from a SUPL agent, receiving a message which includes the target SET capabilities, determining a positioning method currently available in the target SET based on the target SET capabilities, transmitting a message including the determined positioning method to the target SET,
wherein the target SET capabilities include parameters of positioning methods existing in the target SET, a currently available positioning method and positioning protocols, and
wherein the H-SLP receives a positioning start message, which includes a positioning capability containing information about currently availability of at least one positioning method from the target SET, and determines if the positioning capability is identical to the target SET capabilities when receiving the positioning start message.

2. The H-SLP as claimed in claim 1, wherein the H-SLP determines a new positioning method which can be provided from among positioning methods contained in the positioning capability when it is determined that the positioning capability is not identical to the target SET capabilities, and then transmits the determined new positioning method to the target SET so that the target SET can store the determined new positioning method.

3. The H-SLP as claimed in claim 1, wherein the H-SLP performs a positioning with the target SET by using the determined positioning method when it is determined that the positioning capability is identical to the target SET capabilities.

4. The H-SLP as claimed in claim 1, wherein the message including the target SET capabilities corresponds to a SUPL TRIGGERED START message, the message including the determined positioning method corresponds to a SUPL TRIGGERED RESPONSE message, and the positioning start message corresponds to a SUPL POS INIT message.

5. A target SUPL-Enabled terminal (target SET) in a system for providing triggered location information, the system comprising a Home-SUPL Location Platform (H-SLP) and the target SET, the target SET comprising:
the target SET for transmitting a message, which includes the target SET capabilities containing parameters of positioning methods existing in the target SET, a currently available positioning method, and positioning protocols, in response to a request for location information, receiving a message including the determined positioning method from the target SET, and transmitting a positioning start message, which includes a positioning capability containing information about availability of at least one positioning method when a preset location information transmission condition is satisfied.

6. A method for providing triggered location information in a location information providing system which comprises a Home-SUPL Location Platform (H-SLP) and a target SUPL-Enabled terminal (target SET), the method comprising the steps of:
receiving, by the H-SLP, a request message for triggered location reporting service about the target SET from a SUPL agent;
receiving, by the H-SLP, a message which includes the target SET capabilities containing parameters of positioning methods existing in the target SET, a currently available positioning method and positioning protocols;
determining, by the H-SLP, a currently available positioning method, and transmitting a message including the determined positioning method to the target SET;
receiving a positioning start message, which includes a positioning capability containing information about currently availability of at least one positioning method, from the target SET; and
determining if the positioning capability is identical to the target SET capabilities when receiving the positioning start message.

7. The method as claimed in claim 6, further comprising a step of performing, by the H-SLP, a positioning with the target SET by using the determined positioning method when it is determined that the positioning capability is identical to the target SET capabilities.

8. The method as claimed in claim 6, further comprising the steps of:
determining, by the H-SLP, a new positioning method which can be provided among positioning methods included in the positioning capability when it is determined that the positioning capability is not identical to the target SET capabilities; and
transmitting the determined new positioning method to the target SET so that the target SET can store the determined new positioning method.

9. The method as claimed in claim 6, wherein the step of transmitting the message including the positioning capability to the H-SLP comprises the steps of:
checking, by the target SET, a currently supportable positioning method and a positioning capability representing whether the currently supportable positioning method is available; and
transmitting a positioning start message including a new positioning capability.

10. The method as claimed in claim 6, wherein the message including the first positioning capability corresponds to a SUPL TRIGGERED START message, the message including the determined positioning method corresponds to a SUPL TRIGGERED RESPONSE message, and the message including the second positioning capability corresponds to a SUPL POS INIT message.

11. A method for providing triggered location information in a location information providing system which comprises a Home-SUPL Location Platform (H-SLP) and a target SUPL-Enabled terminal (target SET), the method comprising the steps of:
transmitting, by the target SET, a message which includes the target SET capabilities containing parameters of positioning methods existing in the target SET, a currently available positioning method, and positioning protocols, in response to a request for location information,
receiving, by the target SET, a message including the determined positioning method from the target SET, and
transmitting, by the target SET, a positioning start message, which includes a positioning capability containing information about availability of at least one positioning method when a preset location information transmission condition is satisfied.

12. A system for providing triggered location information, the system comprising a Home-SUPL Location Platform (H-SLP) and a target SUPL-Enabled terminal (target SET), the system comprising:
the target SET for transmitting a message, which includes a first positioning capability containing information about availability of at least one positioning method, in response to a request for location information from the H-SLP, determines if a positioning method determined by the H-SLP is available when a preset location information transmission condition is satisfied, and transmitting a positioning start message, which includes a second positioning capability according to a result of the determination; and the H-SLP for determining a positioning method which can be provided by the H-SLP when receiving the message including the first positioning capability, transmitting a message including the determined positioning method to the target SET, and performing a positioning with the target SET by using the determined positioning method when the second positioning capability included in the positioning start message is identical to the first positioning capability.

13. The system as claimed in claim 12, wherein, when it is determined that the second positioning capability is not identical to the first positioning capability, the H-SLP determines a new positioning method which can be provided among positioning methods contained in the second positioning capability, and then transmits the determined new positioning method to the target SET so that the target SET can store the determined new positioning method.

14. The H-SLP as claimed in claim 1, wherein the H-SLP determines the positioning method currently available in the target SET, when there may be a plurality of determined positioning methods, and generates information about the plurality of determined positioning methods corresponding to the respective priorities.

15. The H-SLP as claimed in claim 1, wherein the H-SLP transmits an MLP TLRA message to the SUPL agent, and
wherein the MLP TLRA message functions to notify a SUPL agent that the request for the triggered location request service has been accepted.

16. The H-SLP as claimed in claim 1, wherein the H-SLP transmits a SUPL NIT message to the target SET when it is determined the SUPL agent has been authorized to receive a location value of the target SET.

17. The target SET as claimed in claim 5, wherein the target SET checks a currently supportable positioning capability and a positioning capability that represents whether the currently supportable positioning capability is available whenever the preset location information transmission condition is satisfied, and then transmits a positioning start message including a new positioning capability to the H-SLP.

18. The target SET as claimed in claim 5, wherein the preset location information transmission condition include a condition that a period set to provide a location service has expired, or a condition that the target SET has arrived at a specified position.

19. The target SET as claimed in claim 5, wherein the H-SLP performs a positioning with the target SET by using the determined positioning method, when it is determined that the positioning capability is identical to the target SET capabilities.

20. The method as claimed in claim 6, further comprising determining that the positioning method currently available in the target SET, when there may be a plurality of determined positioning methods, generating information about the plurality of determined positioning methods corresponding to the respective priorities.

21. The method as claimed in claim 6, further comprising, transmitting an MLP TLRA message to the SUPL agent, and
wherein the MLP TLRA message functions to notify a SUPL agent that the request for the triggered location request service has been accepted.

22. The method as claimed in claim 6, wherein the receiving a request message for triggered location reporting service about the target SET from a SUPL agent, further comprising;
transmitting a SUPL NIT message to the target SET when it is determined the SUPL agent has been authorized to receive a location value of the target SET.

23. The method as claimed in claim 11, further comprising checking, by the target SET, a currently supportable positioning capability and a positioning capability that represents whether the currently supportable positioning capability is available wherein, whenever the preset location information transmission condition is satisfied, transmitting a positioning start message including a new positioning capability to the H-SLP.

24. The method as claimed in claim 11, wherein the preset location information transmission condition include a condition that a period set to provide a location service has expired, or a condition that the target SET has arrived at a specified position.

* * * * *